US010286569B1

(12) United States Patent
Heaton

(10) Patent No.: US 10,286,569 B1
(45) Date of Patent: May 14, 2019

(54) CUT-OUT TOOL

(71) Applicant: Kenneth Guy Heaton, Orange, CA (US)

(72) Inventor: Kenneth Guy Heaton, Orange, CA (US)

( * ) Notice: Subject to any disclaimer, the term of this patent is extended or adjusted under 35 U.S.C. 154(b) by 0 days.

(21) Appl. No.: 15/725,272

(22) Filed: Oct. 4, 2017

Related U.S. Application Data

(63) Continuation-in-part of application No. 14/121,460, filed on Sep. 9, 2014, now abandoned, which is a continuation-in-part of application No. 12/925,965, filed on Nov. 3, 2010, now Pat. No. 8,858,135.

(51) Int. Cl.
*B23C 1/20* (2006.01)
*B26D 3/16* (2006.01)
*B26D 7/26* (2006.01)

(52) U.S. Cl.
CPC ........... *B26D 3/163* (2013.01); *B26D 7/2635* (2013.01); *Y10T 409/30644* (2015.01)

(58) Field of Classification Search
CPC ... Y10T 409/30644; Y10T 409/306384; Y10T 409/307616; Y10T 82/16639; Y10T 82/16951; Y10T 82/22; Y10T 82/2522; Y10T 82/12; B26D 3/163; B23C 1/20
See application file for complete search history.

(56) References Cited

U.S. PATENT DOCUMENTS 622,681 A * 4/1899 Hervey ................ B23D 21/145 30/104
3,717,056 A * 2/1973 Gracin ................. B23D 45/128 82/113
3,999,292 A * 12/1976 Breese ...................... B23B 5/14 30/105
4,652,184 A * 3/1987 Fischer ................. B23B 49/006 175/209
4,750,536 A * 6/1988 Grisley .............. B23Q 11/0046 144/251.3
5,815,926 A * 10/1998 Ekern .................... B23D 21/14 30/103

(Continued)

FOREIGN PATENT DOCUMENTS

JP 2002210611 A * 7/2002

OTHER PUBLICATIONS

JP 2002-210611 Machine Translation, pp. 3-6, Jan. 30, 2017.*

*Primary Examiner* — Nicole N Ramos
(74) *Attorney, Agent, or Firm* — Quickpatents, LLC; Kevin Prince

(57) ABSTRACT

A cutting guide system used with a rotary cutting tool to cut a sink drain fitting in a sink includes a cylindrical sink collar having an open lower end with a radially-projecting lower edge. A cylindrical tool engagement collar at an open top end engages the rotary cutting tool, and at an outside surface engages an inner wall of the cylindrical sink collar. A rotary shaft engages a rotary tool chuck at a proximal end and has at a distal end a rotary blade mount for a generally circular rotary blade. With the tool engagement collar fixed with the rotary cutting tool, and with the sink collar fixed with the tool engagement collar, the rotary cutting tool is inserted into the sink drain fitting to cut through the sink drain fitting in a circular path. Spark arresters, a garbage disposable support stand, and a debris-catching bowl are further included.

15 Claims, 5 Drawing Sheets

(56) References Cited

U.S. PATENT DOCUMENTS

| | | | | |
|---|---|---|---|---|
| 7,574,807 | B1 * | 8/2009 | Fuller | B23D 45/128<br>166/298 |
| 8,858,135 | B2 * | 10/2014 | Heaton | B26D 3/163<br>30/103 |
| 2007/0243031 | A1 * | 10/2007 | Yun | B23B 47/00<br>408/67 |

* cited by examiner

CUT-OUT TOOL

CROSS-REFERENCE TO RELATED APPLICATIONS

This application is a continuation-in-part of U.S. patent application Ser. No. 14/121,460, filed Sep. 9, 2014, which, in turn is a continuation-in-part of U.S. patent application Ser. No. 12/925,965, filed Nov. 3, 2010, now issued as U.S. Pat. No. 8,858,135, and the benefit of these earlier filing dates is claimed for all matter common therewith.

STATEMENT REGARDING FEDERALLY SPONSORED RESEARCH AND DEVELOPMENT

Not Applicable.

FIELD OF THE INVENTION

This invention relates to plumbing, and more particularly to a cutting guide system for cutting sink drain fittings.

DISCUSSION OF RELATED ART

Those engaged in installing and/or replacing garbage disposals suspended from the underside of a sink drain fitting mounted in a kitchen sink are well aware of the difficulties associated with this task which are often compounded by the corrosion that invariably infests the very narrow spaces within which the suspending engagement is made. Simply, the corrosive environment of this very basic connection combined with the leakage limiting function thereof have resulted in a very minimal structure of the drain fitting itself that is usually replaced as a part of the repair or replacement process. Little effort is therefore devoted to save the old drain fitting as it is simply replaced as a part of a properly done repair.

In the current practice the drain fitting is fixed within the sink drain seat by an annular flange or ring retaining groove captured below the sink by a split ring seated in a ring groove formed in the neck of the drain fitting. Once so captured, a set of screws extending through the flange are advanced against the sink bottom to pull the drain fitting into an intimate sealing engagement against the seat, with the same flange then also providing the attachment structure for suspending the garbage disposal therefrom.

Of course, any removal process would ordinarily follow a reverse sequence of steps which, of necessity, entails the loosening of the tightened screws within the narrow confines beneath the sink, a manipulation that is often many years after the sink drain was first installed and now rendered substantially more difficult by long periods of corrosion.

Even if somehow properly done this cumbersome removal process will invariably disrupt the original sealing contact between the drain fitting and the sink which may exhibit itself right after the job is done, or more often at some later time that may be much less convenient. Consequently good workmanship and also the natural corrosion processes compel the replacement of the simple drain fitting structure as a part of the repair, a replacement rendered most convenient by a powered cutting tool assisting in the extraction of the old fitting that may be fixed by years of corrosion in its mounted place.

In the past various cutting mechanisms and fixtures have been devised which in one way or another cut a pipe or tubing from the interior. Examples of such cutting devices may be found in the teachings of U.S. Pat. No. 4,369,573 to Vitale; U.S. Pat. No. 4,466,185 to Moutiero; U.S. Pat. No. 4,932,125 to Poveromo; U.S. Pat. No. 5,815,926 to Ekem; U.S. Pat. No. 6,508,975 to Godlewski et al.; U.S. Pat. No. 7,574,807 to Fuller et al.; and many others. Each of the foregoing, while suitable for the purposes intended, teaches a cutting tool that is deployable inside a tube to cut through the wall thereof at the point of its axial deployment and therefore little attention has been devoted to control both the radial and axial excursion of the cutting blade. In contrast, the cut that allows removal of a drain fitting mounted in a sink needs to avoid direct blade contact with the sealing surfaces of the sink and/or direct contact with any other structure, and therefore must be both axially aligned right over the exterior ring groove in order to release the captured flange retaining the drain fitting in the sink while avoiding any other cutting contact. Any axial departure from this deployment will either leave the ring in its capturing engagement against the flange, resulting in a useless cutting process, or in its upper ranges will expose the user and any surrounding structure to potential injury or potential cutting damage. Further, sparks generated by such an operation should be adequately captured and arrested, and provision for cutting drain fittings associated with garbage disposal appliances or merely a drain should be provided. Of course, since the replacement of garbage disposals is relatively infrequent, these attributes need to be simply and reliably implemented in an inexpensive mechanism and it is such alignment mechanism that is disclosed herein.

SUMMARY OF THE INVENTION

The present device is a cutting guide system for a rotary cutting tool having a chuck and used to cut a sink drain fitting that has a ring retaining groove and resides in a sink, which is typically a one or two bowl kitchen sink, for example. Such a sink has at least one drain at a bottom of the sink, a drain pipe fluidly connected with the drain, optionally a garbage disposal, and an outside seam between the garbage disposal and the sink drain or between the drain pipe and the drain.

The cutting guide system includes a cylindrical sink collar having an open lower end with a radially-projecting lower edge. The sink collar further includes an upper end, an inner wall and an outer wall.

A cylindrical tool engagement collar is configured at an open top end thereof for selective engagement with the rotary cutting tool, and further configured at an outside surface thereof for selective engagement with the inner wall of the cylindrical sink collar using a cylinder attachment mechanism. The cylindrical tool engagement collar further includes an open lower end.

A rotary shaft is configured at a proximal end thereof for engaging the chuck of the rotary tool. The rotary shaft has at an opposing distal end thereof a rotary blade mount configured for selective engagement with a generally circular rotary blade. A top cap is adapted for rotationally-locked engagement with the rotary blade at a proximal side of the rotary blade, and for rotationally-free engagement with an idler guide that is rotationally fixed with the distal end of the rotary shaft at a bearing. The distal end of the rotary shaft preferably includes a selectively removable bolt configured for threadable engagement with the rotary shaft, such that the rotary blade may be interchanged with another rotary blade by removing and then re-engaging the removable bolt.

As such, with the tool engagement collar fixed with the rotary cutting tool, and with the sink collar fixed with the tool engagement collar, the rotary cutting tool is inserted into the sink drain fitting and activated to spin the rotary blade to cut through the sink drain fitting proximate the ring retaining groove. The idler guide contacts the sink drain fitting below a cut formed by the rotary blade to limit radial penetration of the rotary blade excessively beyond the sink drain fitting. The rotary cutting tool is then moved in a circular path to fully cut around the sink drain fitting.

In some embodiments of the cutting guide system further includes a spark arresting belt configured for selective attachment around the outside seam of the sink drain fitting. As such, outwardly-flying sparks caused by cutting of the sink drain fitting are captured and arrested. Some preferred embodiments of the cutting guide system further include a spark arrestor fitting configured for attachment to the drain pipe and having a cylindrical outer wall. As such the spark arrestor fitting is fitted to the drain pipe of a garbage disposal fixed with the sink fitting. A shop vacuum cleaner hose may then be fitted to the cylindrical outer wall of the spark arrestor fitting, thereby allowing vacuuming of cutting debris through the spark arrestor fitting and out of the garbage disposal.

In some embodiments a garbage disposal stand may be included to facilitate removal and installation of the garbage disposal, and a debris-catching bowl to catch cutting debris while cutting through the sink drain fitting.

The present invention is a cutting tool system that is deployable inside a tube to cut through the wall thereof to allow removal of the drain fitting while avoiding direct blade contact with the sealing surfaces of the sink and/or direct contact with any other structure. Further, sparks generated by such a cutting operation are captured and arrested, and provision for cutting drain fittings associated with garbage disposal appliances or merely a drain are provided. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
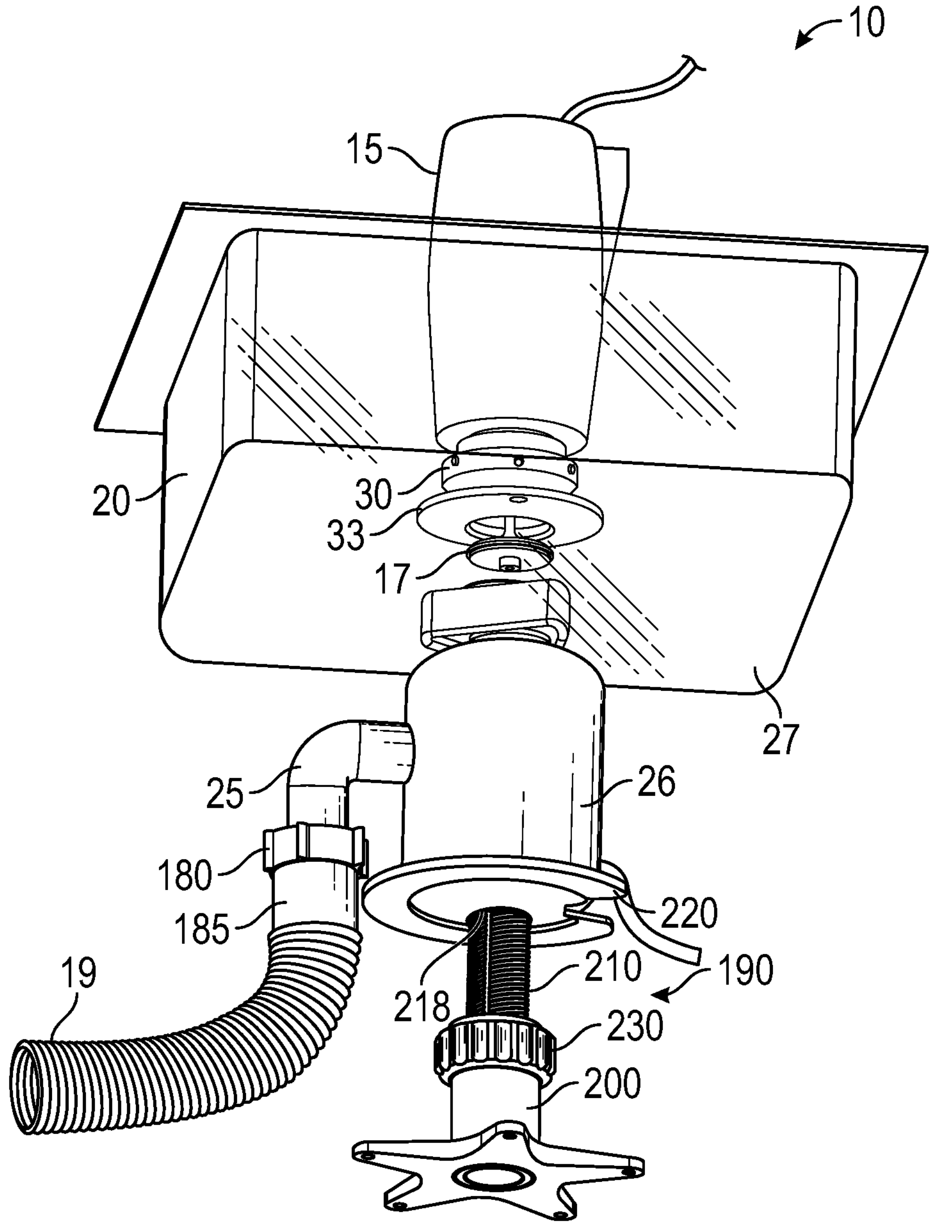
FIG. 1 is bottom perspective view of the invention as used with a rotary cutting tool on a sink having a garbage disposal appliance.
Figure 2:
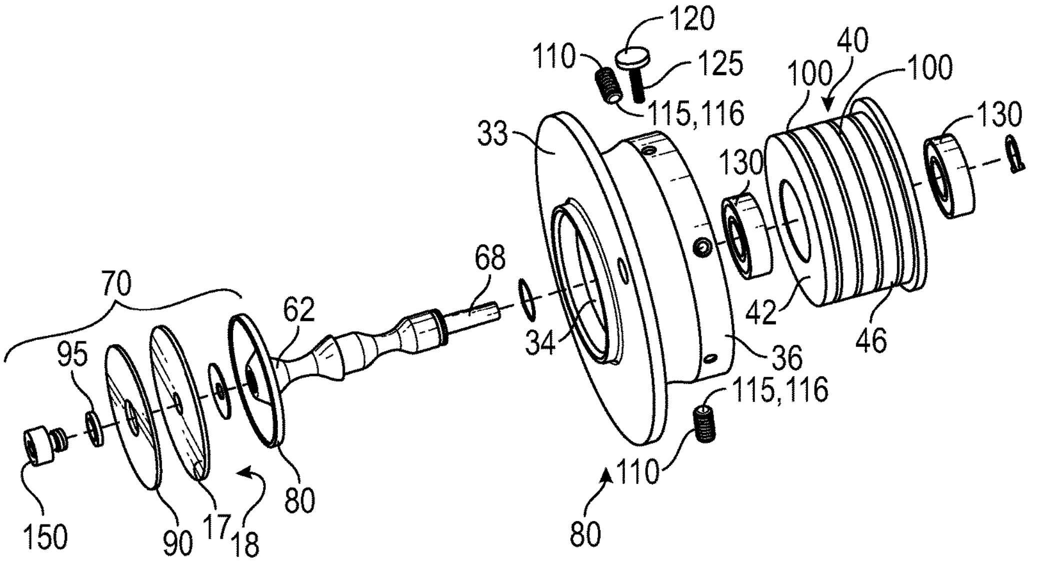
FIG. 2 is a perspective exploded view of the invention.
Figure 5:
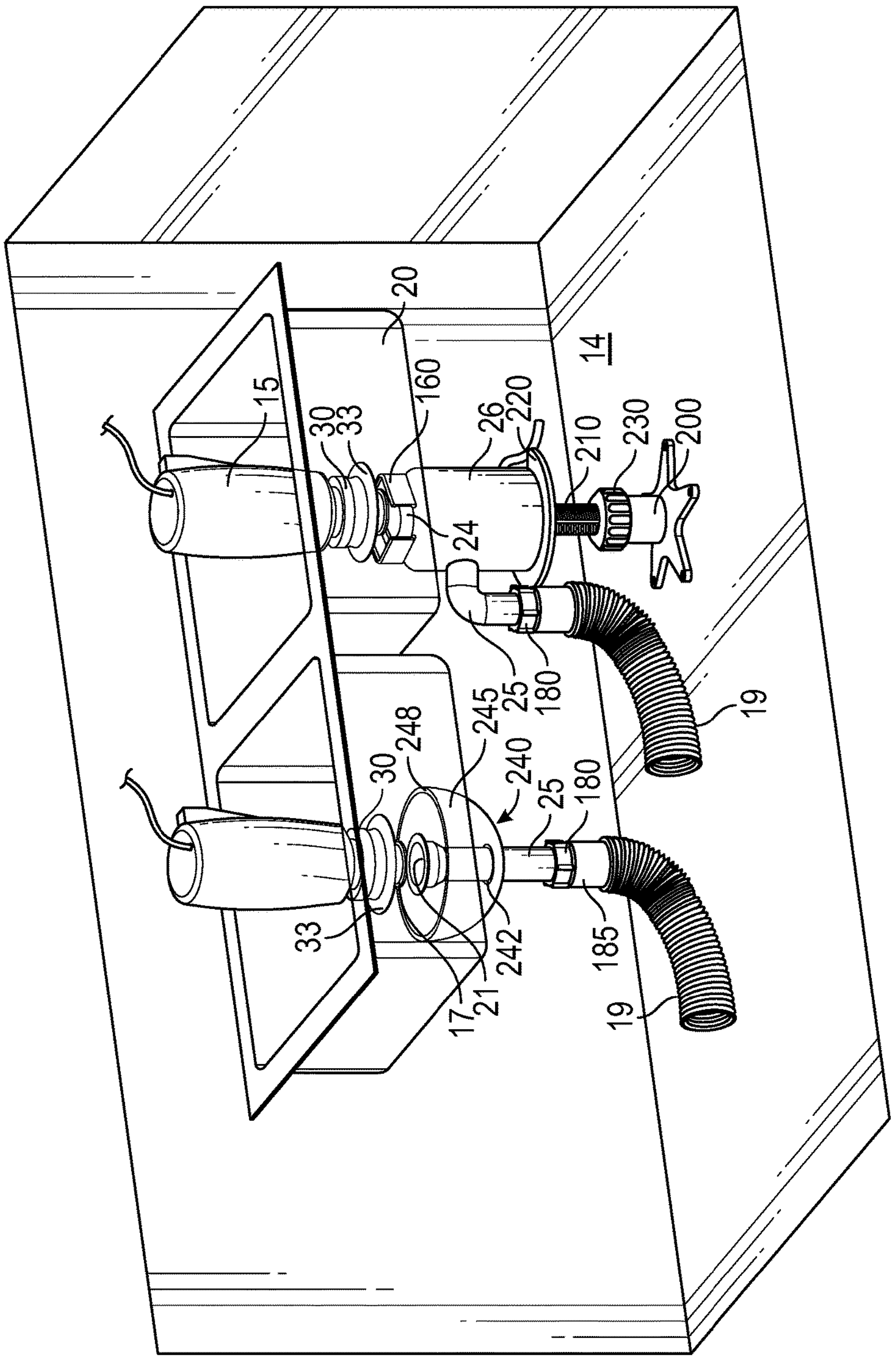
FIG. 5 is a top plan view of the invention, showing the device as used in sinks with different fittings and appliances.

FIGS. 1-2 illustrate a cutting guide system 10 for a rotary cutting tool 15 having a chuck 16 not shown) and used to cut a sink drain fitting 22 that has a ring retaining groove 23 and resides in a sink 20, which is typically a one or two bowl kitchen sink 20, for example (FIGS. 1 and 5). Such a sink 20 has at least one drain 21 at a bottom 27 of the sink 20, a drain pipe 25 fluidly connected with the drain 21, optionally a garbage disposal 26, and an outside seam 24 between the garbage disposal 26 and the sink drain 21 or between the drain pipe 25 and the drain 21. Such a rotary cutting tool 15 may be any of the various brands of electric rotary cutting tools sold that have a high RPM motor.

The cutting guide system 10 includes a cylindrical sink collar 30 having an open lower end 32 with a radially-projecting lower edge 33. The sink collar 30 further includes an upper end 38, an inner wall 34 and an outer wall 36.

A cylindrical tool engagement collar 40 is configured at an open top end 48 thereof for selective engagement with the rotary cutting tool 15, and further configured at an outside surface 46 thereof for selective engagement with the inner wall 34 of the cylindrical sink collar 30 using a cylinder attachment mechanism 50. The cylindrical tool engagement collar 40 further includes an open lower end 42, and is preferably made of a rigid plastic or metal material.

A rigid, metallic rotary shaft 60 is configured at a proximal end 68 thereof for engaging the chuck 16 not shown) of the rotary tool 15. The rotary shaft 60 has at an opposing distal end 62 thereof a rotary blade mount 70 configured for selective engagement with a generally circular rotary blade 17. A top cap 80 is adapted for rotationally-locked engagement with the rotary blade 17 at a proximal side 18 of the rotary blade 17, and for rotationally-free engagement with an idler guide 90 that is rotationally fixed with the distal end 68 of the rotary shaft 60 at a bearing 95 (FIG. 2). The distal end 62 of the rotary shaft 60 preferably includes a selectively removable bolt 150 configured for threadable engagement with the rotary shaft 60, such that the rotary blade 17 may be interchanged with another rotary blade 17 by removing and then re-engaging the removable bolt 150.

As such, with the tool engagement collar 40 fixed with the rotary cutting tool 15, and with the sink collar 30 fixed with the tool engagement collar 40, the rotary cutting tool 15 is inserted into the sink drain fitting 22 and activated to spin the rotary blade 17 to cut through the sink drain fitting 22 proximate the ring retaining groove 23. The idler guide 90 contacts the sink drain fitting 22 below a cut formed by the rotary blade 17 to limit radial penetration of the rotary blade 17 excessively beyond the sink drain fitting 22. The rotary cutting tool 15 is then moved in a circular path to fully cut around the sink drain fitting 22. Preferably the projecting lower edge 33 of the sink collar 30 is sufficiently large to cover the sink drain fitting 22, such that outwardly-flying sparks caused by cutting of the sink drain fitting 22 even when the idler guide 90 is contacting the sink fitting 22.

Preferably the attachment mechanism 50 includes a plurality of circumferential grooves 100 formed in the outside surface 46 of the tool engagement collar 40. A plurality of set screws 110 traverse the sink collar 30 from the outer wall 36 to the inner wall 34. Each set screw 110 having a spring-biased detent element 115, such as a steel ball bearing 116, configured to engage one of the circumferential grooves 100 and to retract upon sufficient pressure applied thereto by moving the sink collar 30 longitudinally along the tool engagement collar 40 from one groove 100 to an adjacent groove 100. A locking knob 120 is included that has a threaded shaft 125 configured to traverse the sink collar 30 so as to tighten against the tool engagement collar 40 to lock the relative position of the sink collar 30 to the tool engagement collar 40.

Preferably the tool engagement collar 40 includes at least one roller bearing 130 (FIG. 2) engaged between the rotary shaft 60 and the tool engagement collar 40, such that the rotary shaft 60 rotates within the tool engagement collar 40 but is fixed longitudinally with respect to the tool engagement collar 40. The tool engagement collar 40 is also preferably fixed with the rotary cutting tool 15 with thread 140 formed on an inner wall of the tool engagement collar 40.

Figure 3:
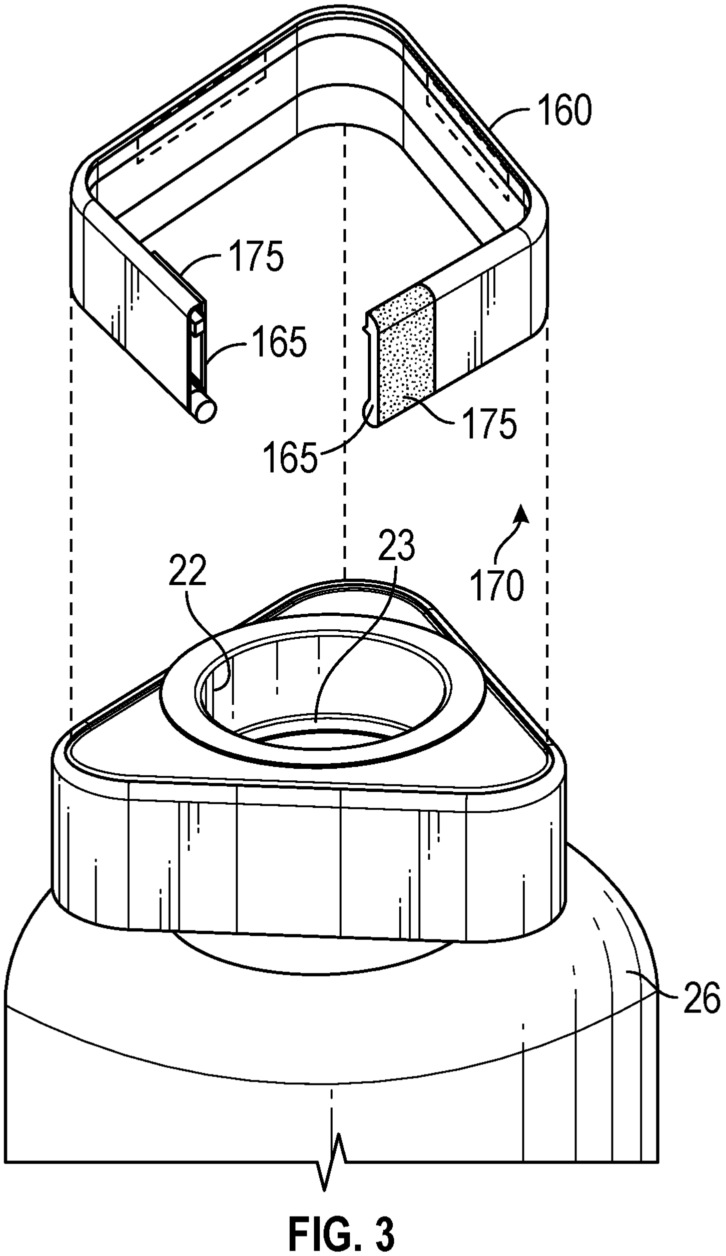
FIG. 3 is a partial exploded perspective view of a spark arresting belt of the invention.
Figure 4:
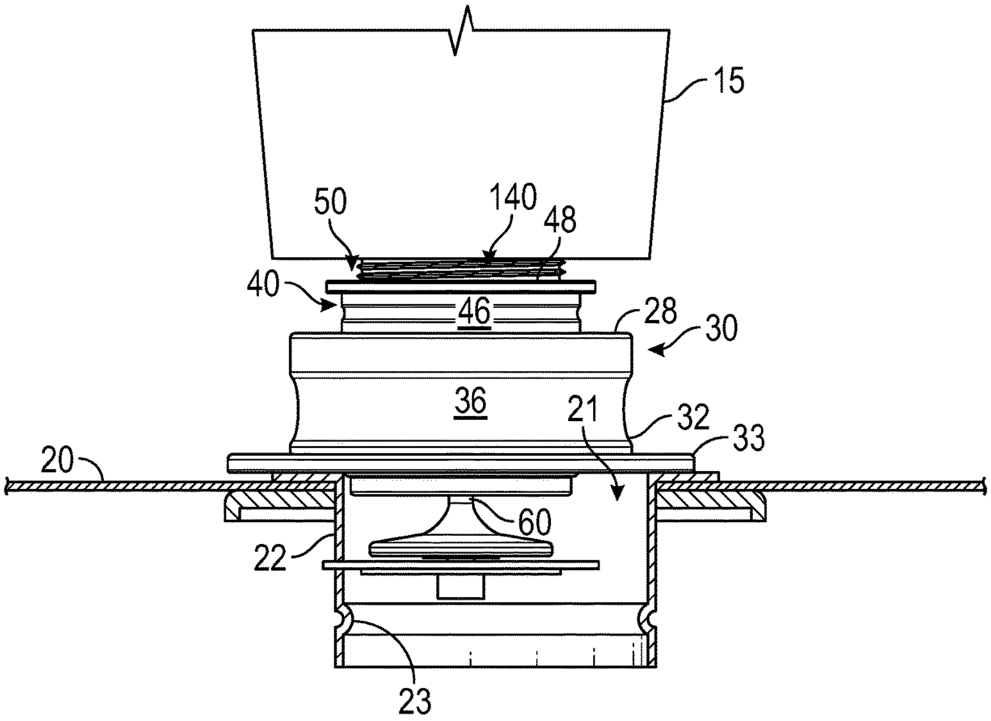
FIG. 4 is a partial cross-sectional view of the invention, illustrating a cutting guide system of the invention as used when cutting through a sink fitting.

In some embodiments of the cutting guide system 10 further includes a flexible, insulated spark arresting belt 160 (FIG. 3) configured for selective attachment around the outside seam 24 of the sink drain fitting 22. As such, outwardly-flying sparks caused by cutting of the sink drain fitting 22 are captured and arrested by a brass or other metallic wool-type material. A mechanical fastening mechanism 170, such as a hook-and-loop type fastener 175, may be included on the spark arresting belt 160 on opposing ends 165 thereof to for selective attachment to the sink drain fitting 22.

Some preferred embodiments of the cutting guide system 10 further include a spark arrestor fitting 180 configured for attachment to the drain pipe 25 and having a cylindrical outer wall 185 and a metallic wool-type material inside. As such the spark arrestor fitting 180 is fitted to the drain pipe 25 of a garbage disposal 26 fixed with the sink fitting 22. A shop vacuum cleaner hose 19 may then be fitted to the cylindrical outer wall 185 of the spark arrestor fitting, thereby allowing vacuuming of cutting debris through the spark arrestor fitting and out of the garbage disposal.

In some embodiments a garbage disposal stand 190 may be included to facilitate removal and installation of the garbage disposal 26. Such a garbage disposal stand 190 includes a rigid plastic or metal base 200 adapted for resting on a support surface 14, such as the bottom surface 14 of a cabinet. A threaded plastic or metallic shaft 210 has a rigid platform 220 at a top end 218 thereof. A manually-actuable knob 230 engages the threaded shaft 210 to raise or lower the shaft 210 and platform 220 with respect to the base 200. As such the stand 190 can be positioned below the garbage disposal 26 fixed with the sink fitting 22 with the platform 220 raised to support the garbage disposal 26 when released after cutting through the sink drain fitting 22. Preferably the threaded shaft 210 includes a thread with at least six starts 212, so that a relatively short turn of the knob 230 raises or lowers the platform 220 a relatively large distance.

The cutting guide system 10 may further include a debris-catching bowl 240 that has an open top side 248, a side wall 245, and a drain pipe opening 243 traversing a bottom side 242. As such, with sinks 20 without the garbage disposal 26 but having a drain 21 and a drain pipe 26, the debris-catching bowl 240 is pressed up against the bottom side 27 of the sink 20 with the drain pipe 25 traversing the drain pipe opening 243 to catch cutting debris while cutting through the sink drain fitting 22. Such a debris-catching bowl 240 is preferably at least partially transparent to see the debris caught in the bowl 240.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A cutting guide system for a rotary cutting tool having a chuck and used to cut a sink drain fitting having a ring retaining groove, comprising:

a cylindrical sink collar having an open lower end with a radially-projecting lower edge, an open upper end, an inner wall and an outer wall;

a cylindrical tool engagement collar having an open top end and an outside surface, the open top end interpositioned for selective engagement with the rotary cutting tool, and the outside surface interpositioned for selective engagement with the inner wall of the cylindrical sink collar using a cylinder attachment mechanism, the cylindrical tool engagement collar having an open lower end; and a rotary shaft configured at a proximal end for engaging the chuck of the rotary tool, the rotary shaft having at an opposing distal end thereof a rotary blade mount configured for selective engagement with a generally circular rotary blade and having a top cap adapted for rotationally-locked engagement with the rotary blade at a proximal side of the rotary blade and for rotationally-free engagement with an idler guide rotationally fixed with the distal end of the shaft at a bearing;

wherein the cylinder attachment mechanism includes a plurality of circumferential grooves formed in the outside surface of the tool engagement collar and a plurality of set screws traversing the sink collar from the outer wall to the inner wall, each set screw having a spring-biased detent element configured to engage one of the circumferential grooves and to retract upon sufficient pressure applied thereto by moving the sink collar longitudinally along the tool engagement collar from one groove to an adjacent groove;

whereby with the tool engagement collar fixed with the rotary cutting tool, and with the sink collar fixed with the tool engagement collar, the rotary cutting tool is inserted into the sink drain fitting and activated to spin the rotary blade to cut through the sink drain fitting proximate the ring retaining groove, the idler guide contacting the sink drain fitting below a cut formed by the rotary blade to limit radial penetration of the rotary blade excessively beyond the sink drain fitting, the rotary cutting tool then moved in a circular path to fully cut the sink drain fitting.

2. The cutting guide system of claim 1 wherein the biased element of each set screw is a ball bearing.

3. The cutting guide system of claim 1 further including a locking knob having a threaded shaft configured to traverse the sink collar to tighten against the tool engagement collar to lock the relative position of the sink collar to the tool engagement collar.

4. The cutting guide system of claim 1 wherein the tool engagement collar includes at least one roller bearing engaged between the rotary shaft and the tool engagement collar, whereby the rotary shaft rotates within the tool engagement collar but is fixed longitudinally with respect to the tool engagement collar.

5. A cutting guide system for a rotary cutting tool having a chuck and used to cut a sink drain fitting having a ring retaining groove, comprising:

a cylindrical sink collar having an open lower end with a radially-projecting lower edge, an open upper end, an inner wall and an outer wall;

a cylindrical tool engagement collar having an open top end and an outside surface, the open top end interpositioned for selective engagement with the rotary cutting tool, and the outside surface interpositioned for selective engagement with the inner wall of the cylindrical sink collar using a cylinder attachment mechanism, the cylindrical tool engagement collar having an open lower end, the tool engagement collar being fixed with the rotary cutting tool with threads formed on the inner wall thereof;

a rotary shaft configured at a proximal end for engaging the chuck of the rotary tool, the rotary shaft having at an opposing distal end thereof a rotary blade mount configured for selective engagement with a generally circular rotary blade and having a top cap adapted for rotationally-locked engagement with the rotary blade at a proximal side of the rotary blade and for rotationally-free engagement with an idler guide rotationally fixed with the distal end of the shaft at a bearing;

whereby with the tool engagement collar fixed with the rotary cutting tool, and with the sink collar fixed with the tool engagement collar, the rotary cutting tool is inserted into the sink drain fitting and activated to spin the rotary blade to cut through the sink drain fitting proximate the ring retaining groove, the idler guide contacting the sink drain fitting below a cut formed by the rotary blade to limit radial penetration of the rotary blade excessively beyond the sink drain fitting, the rotary cutting tool then moved in a circular path to fully cut the sink drain fitting.

6. The cutting guide system of claim 1 wherein the distal end of the rotary shaft includes a selectively removable bolt configured for threadable engagement with the rotary shaft, whereby the rotary blade may be interchanged with another rotary blade by removing and then re-engaging the removable bolt.

7. The cutting guide system of claim 1 wherein the projecting lower edge of the sink collar is sufficiently large to cover the sink drain fitting even when idler guide is contacting the sink fitting.

8. A cutting guide system for a rotary cutting tool having a chuck and used to cut a sink drain fitting having a ring retaining groove, comprising:

a cylindrical sink collar having an open lower end with a radially-projecting lower edge, an open upper end, an inner wall and an outer wall;

a cylindrical tool engagement collar having an open top end and an outside surface, the open top end interpositioned for selective engagement with the rotary cutting tool, and the outside surface interpositioned for selective engagement with the inner wall of the cylindrical sink collar using a cylinder attachment mechanism, the cylindrical tool engagement collar having an open lower end;

a rotary shaft configured at a proximal end for engaging the chuck of the rotary tool, the rotary shaft having at an opposing distal end thereof a rotary blade mount configured for selective engagement with a generally circular rotary blade and having a top cap adapted for rotationally-locked engagement with the rotary blade at a proximal side of the rotary blade and for rotationally-free engagement with an idler guide rotationally fixed with the distal end of the shaft at a bearing;

a spark arresting belt configured for selective attachment around an outside seam of the sink drain fitting;

whereby with the tool engagement collar fixed with the rotary cutting tool, and with the sink collar fixed with the tool engagement collar, the rotary cutting tool is inserted into the sink drain fitting and activated to spin the rotary blade to cut through the sink drain fitting proximate the ring retaining groove, the idler guide contacting the sink drain fitting below a cut formed by the rotary blade to limit radial penetration of the rotary blade excessively beyond the sink drain fitting, the rotary cutting tool then moved in a circular path to fully cut the sink drain fitting, outwardly-flying sparks caused by cutting of the sink drain fitting being captured and arrested by the spark arresting belt.

9. The cutting guide system of claim 8 wherein the spark arresting belt includes a mechanical fastening mechanism on opposing ends thereof for selective attachment to the sink drain fitting.

10. The cutting guide system of claim 9 wherein the fastening mechanism includes a hook-and-loop type fastening material.

11. The cutting guide system of claim 8 further including a spark arrestor fitting configured for attachment to a drain pipe and having a cylindrical outer wall, whereby the spark arrestor fitting is fitted to the drain pipe of a garbage disposal fixed with the sink fitting, and whereby a shop vacuum cleaner hose is fitted to the cylindrical outer wall of the spark arrestor fitting, thereby allowing vacuuming of cutting debris through the spark arrestor fitting and out of the garbage disposal.

12. The cutting guide system of claim 1 further including a garbage disposal stand having a base adapted for resting on a support surface, a threaded shaft having a platform at a top end, and a manually-actuable knob engaging the threaded shaft to raise or lower the shaft and platform with respect to the base, whereby the stand is positioned below a garbage disposal fixed with the sink fitting with the platform raised to support the garbage disposal when released after cutting through the sink drain fitting.

13. The cutting guide system of claim 8 further including a debris-catching bowl having an open top side, a side wall, and a drain pipe opening traversing a bottom side, whereby with sinks without a garbage disposal but having a drain and drain pipe, the debris-catching bowl is pressed up against a bottom side of the sink with the drain pipe traversing the drain pipe opening to catch cutting debris.

14. The cutting guide system of claim 13 further including a spark arrestor fitting configured for attachment to the drain pipe and having a cylindrical outer wall, whereby the spark arrestor is fitted to the drain pipe of the sink, and whereby a shop vacuum cleaner hose is fitted to the cylindrical outer wall of the spark arrestor and active, thereby vacuuming cutting debris through the spark arrestor.

15. The cutting guide of claim 14 wherein at least a portion of the debris-catching bowl is transparent.

* * * * *